(12) United States Patent
Spiegl et al.

(10) Patent No.: US 9,567,994 B2
(45) Date of Patent: Feb. 14, 2017

(54) RECIPROCATING COMPRESSOR HAVING CAPACITY REGULATION

(71) Applicant: HOERBIGER KOMPRESSORTECHNIK HOLDING GMBH, Vienna (AT)

(72) Inventors: Bernhard Spiegl, Vienna (AT); Andreas Brandl, Vienna (AT); Florian Schacherreiter, Vienna (AT)

(73) Assignee: Hoerbiger Kompressortechnik Holding GmbH, Vienna (AT)

(*) Notice: Subject to any disclaimer, the term of this patent is extended or adjusted under 35 U.S.C. 154(b) by 167 days.

(21) Appl. No.: 14/449,756

(22) Filed: Aug. 1, 2014

(65) Prior Publication Data
US 2015/0044080 A1    Feb. 12, 2015

(30) Foreign Application Priority Data
Aug. 8, 2013  (AT) .............. A 50496/2013

(51) Int. Cl.
| | |
|---|---|
| F04B 39/08 | (2006.01) |
| F04B 39/10 | (2006.01) |
| F04B 49/22 | (2006.01) |
| F04B 49/24 | (2006.01) |
| F04B 49/06 | (2006.01) |
| F04B 49/03 | (2006.01) |
| F16K 1/00 | (2006.01) |

(52) U.S. Cl.
CPC .............. *F04B 49/06* (2013.01); *F04B 39/08* (2013.01); *F04B 39/102* (2013.01); *F04B 49/03* (2013.01); *F04B 49/225* (2013.01); *F04B 49/243* (2013.01); *F16K 1/00* (2013.01); *F04B 39/1053* (2013.01)

(58) Field of Classification Search
CPC ....... F04B 39/08; F04B 49/225; F04B 49/243; F04B 49/03; F04B 38/1053
USPC .......................................... 417/298
See application file for complete search history.

(56) References Cited

U.S. PATENT DOCUMENTS

| | | | | |
|---|---|---|---|---|
| 2,245,053 | A * | 6/1941 | Sanders, Jr ........... | F25B 49/022 236/1 E |
| 2,350,537 | A * | 6/1944 | Olav ..................... | F04B 49/225 417/295 |
| 2,730,296 | A * | 1/1956 | Hartwell ............... | F04B 49/243 417/293 |
| 3,119,550 | A * | 1/1964 | West ..................... | F04B 49/06 417/286 |
| 4,326,839 | A * | 4/1982 | Fry ........................ | F04B 49/24 417/295 |
| 4,432,698 | A | 2/1984 | Shirakuma et al. | |
| 4,432,705 | A | 2/1984 | Fraser et al. | |
| 6,206,652 | B1 | 3/2001 | Caillat | |
| 6,575,710 | B2 * | 6/2003 | Wallis ................... | F04B 49/243 417/213 |

(Continued)

FOREIGN PATENT DOCUMENTS

DE            2302250        8/1974

*Primary Examiner* — Peter J Bertheaud
(74) *Attorney, Agent, or Firm* — Dykema Gossett PLLC

(57) ABSTRACT

A shutoff valve (2) which is switchable in a cycled manner for capacity regulation by temporarily shutting off the intake gas feed is designed as a multi-element ring valve, and is directly actuated by means of an electromagnet (12). The actuating forces for switching the shutoff valve (2) may be kept small via pressure compensation from the intake gas feed (3) to behind the anchor plate (9).

10 Claims, 2 Drawing Sheets

(56) References Cited

U.S. PATENT DOCUMENTS

| | | | |
|---|---|---|---|
| 8,496,454 B2* | 7/2013 | Wallis | F04B 27/24 |
| | | | 137/494 |
| 8,500,420 B2* | 8/2013 | Spiegl | F04B 39/08 |
| | | | 137/516.23 |
| 8,840,384 B2* | 9/2014 | Patel | F04C 18/0215 |
| | | | 417/310 |
| 9,377,018 B2* | 6/2016 | Mangiagli | F04B 49/06 |
| 2012/0192583 A1 | 8/2012 | Lifson et al. | |
| 2012/0207623 A1* | 8/2012 | Allenspach | F04B 39/08 |
| | | | 417/53 |
| 2013/0139535 A1* | 6/2013 | Nares | F04B 49/00 |
| | | | 62/228.1 |

* cited by examiner

RECIPROCATING COMPRESSOR HAVING CAPACITY REGULATION

BACKGROUND OF THE INVENTION

Field of the Invention

The invention relates to a reciprocating compressor, in particular as a cooling or air conditioner compressor, having a system for capacity regulation which has at least one shutoff valve, which is situated on the intake side and is switchable between an open position and a closed position in a cycled manner, for temporarily shutting off the intake gas feed.

The Prior Art

Compressors having capacity regulation of the mentioned type are known from EP 982497 B1, EP 1515047 B1, or EP 1279833 B1, for example. In addition, JP 63-138490, U.S. Pat. No. 4,743,168, and other publications disclose systems for capacity regulation, in particular of multi-cylinder reciprocating compressors, which typically regulate only a portion of the cylinders (usually one of multiple cylinder banks) in the described manner with regard to the delivery rate. Due to the constantly changing environmental conditions and required cooling power, in particular cooling and air conditioning systems are operated at different loads over a wide range, which for efficient operation requires a capacity regulation system having the simplest possible design. In this regard, a disadvantage of all systems known thus far is the design of the shutoff valves for regulating the intake gas feed, which for appropriately large flow rates require large valve lifts, which allows only low cycle rates.

The object of the present invention is to improve systems of the above-mentioned type in such a way that the mentioned disadvantages of the systems known thus far are avoided, and that in particular a simple, compact actuation of even quickly cycled switchable shutoff valves is made possible with low suction losses.

SUMMARY OF THE INVENTION

This object is achieved according to the invention in that in a system of the type mentioned at the outset, the shutoff valve is designed as a multi-element ring valve, and, by means of an actuating piston which is connected to a movable anchor plate, is directly actuated via an electromagnet which acts on the valve plate which is thus connected, a pressure compensation channel being provided which originates from the intake gas feed and extends to behind the anchor plate having an adjoining pressure compensation surface (pressure compensation piston). By means of this ring valve, which in reciprocating compressors is often used as a suction valve and/or pressure valve, very large flow cross sections may also be quickly cycled with low flow losses, the advantageous pressure compensation ensuring that the necessary actuating forces may be kept as low as possible, which enables the direct actuation using compact electromagnets (preferably without separate cooling), and keeping the energy consumption of the capacity regulation low.

The greatest advantage of this system, however, is that the required valve cross section is achieved by using a ring valve which has a very small valve lift (1.5 mm, for example). Previously known regulating pistons for cylinder bank shutoffs cover a single large borehole in the valve seat plate. As a result, existing regulating pistons require very large valve lifts (10 mm, for example) in order to achieve the necessary flow cross sections. The large valve lift is a major drawback, and the opening and closing operation has a relatively long duration. This is inefficient because, on the one hand, the flow cross sections are small during the opening and closing phases, and on the other hand this limits the cycle rate of the valve. For a small valve lift, the valve may open (or close) very quickly, as a result of which the valve cross section is momentarily opened up or closed off, respectively, the clock frequency may be increased, and valve impact velocities remain low (high level of robustness).

In recent times, cylinder bank shutoffs are used primarily with clocked actuation. However, the cycle rate is limited from above due to the large lift. The higher the cycle rate, the more infinitely variable the regulation. Stepped capacity regulation has the disadvantage that the necessary delivered quantity (required cooling power) cannot be precisely regulated. This results in efficiency losses. Frequency converters solve the problem, but are costly and may lead to other problems such as vibrations. Via the approach according to the invention of a quickly cycled cylinder bank shutoff, quasi-stepless regulation is ensured by the highest possible cycle rates.

In principle, for the system according to the invention it does not matter whether the valve plate opens in the direction of flow or against the direction of flow of the suction gas; both variants may be achieved by an appropriate configuration and design of the shutoff valve together with its actuation and pressure compensation.

It is preferably provided that the valve plate is spring-loaded in the opening direction. In addition, electromagnetic actuation could also be provided in the opening direction as well as in the closing direction.

In another preferred embodiment of the invention, the pressure compensation channel may extend directly through the ring valve together with the actuating piston and anchor plate, which simplifies the structural design of the compressor housing and optionally also of the cylinder head. Apart from this, however, the pressure compensation channel may also extend in the compressor housing and/or cylinder head in order to simplify the design of the shutoff valve.

In another preferred embodiment of the invention, the valve seat of the shutoff valve as an additional part may also be affixed, preferably pressed in, to the cylinder head or the compressor housing, and, the same as the valve plate or the entire shutoff valve, may be made of plastic.

BRIEF DESCRIPTION OF THE DRAWINGS

The invention is explained in greater detail below with reference to the reciprocating compressors illustrated in the drawings.

DETAILED DESCRIPTION OF THE EXEMPLARY EMBODIMENT

Figure 1:
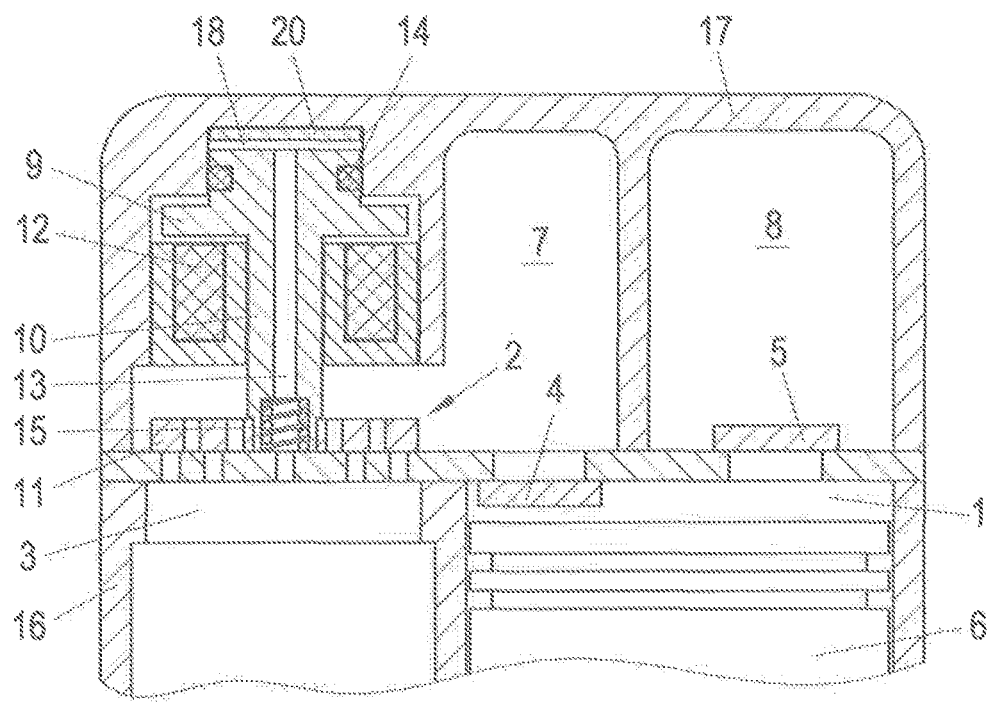
FIGS. 1 and 2 depict a cylinder head area of a reciprocating compressor which includes a switchable shutoff valve for capacity regulation in accordance with a first exemplary embodiment of the invention, in FIG. 1 shown in closed position and in FIG. 2 in open position.
Figure 2:
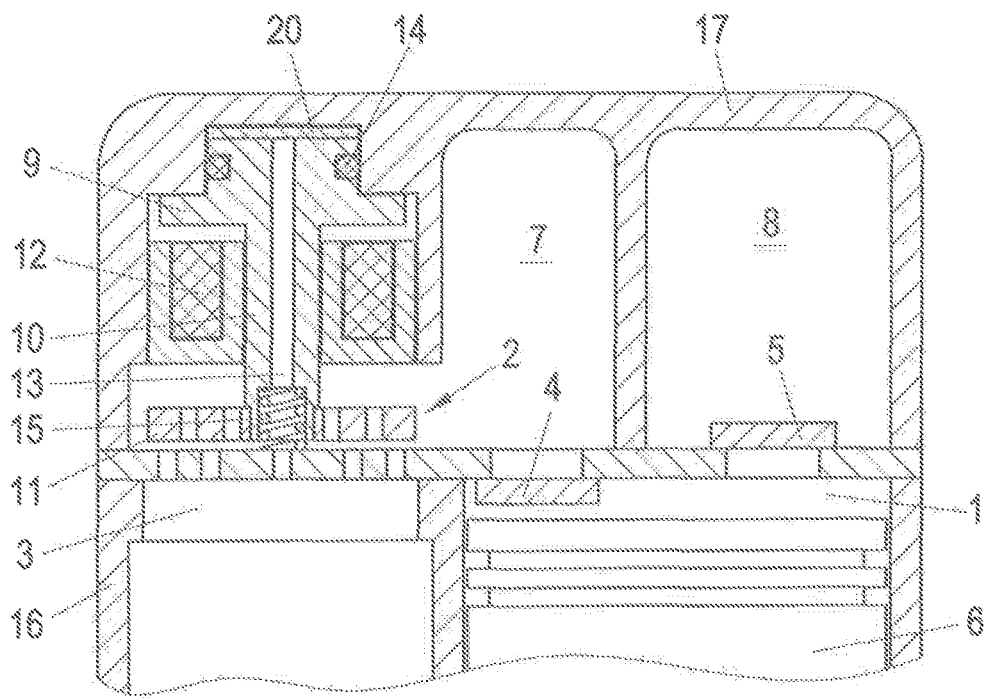

The reciprocating compressor, which is only schematically illustrated in FIGS. 1 and 2, is preferably used as a cooling or air conditioner compressor, and includes a system for capacity regulation which has at least one shutoff valve 2, which is situated on the suction side upstream from a portion of the cylinders 1 and is switchable in a cycled manner between an open position (FIG. 2) and a closed position (FIG. 1) for temporarily shutting off the intake gas feed from the chamber 3 to these cylinders 1. A suction valve, which is designed here as a reed valve, is denoted by reference numeral 4, and a pressure valve which likewise is designed as a reed valve, is denoted by reference numeral 5. The suction valve and the pressure valve control the compression of the gas which is conveyed from the suction chamber 7 into the pressure chamber 8 via the back-and-forth motion of the reciprocating pistons 6 in the cylinder 1.

The shutoff valve 2 is designed as a multi-element ring valve, and, by means of an actuating piston 10 which is connected to a movable anchor plate 9, is directly actuated via an electromagnet 12 which acts on the valve plate 11 which is thus connected. To reduce the required actuating force, a pressure compensation channel 13 is provided which originates from the intake gas feed (chamber 3) and extends through the ring valve 2 together with the actuating piston 10 and the anchor plate 9 to behind the anchor plate 9. In the present case, the chamber 18 above the anchor plate 9 is sealed off by means of a sealing ring 14, so that the pressure which prevails in this chamber 18 when the shutoff valve 2 is closed essentially corresponds to the pressure in the chamber 3, so that when the electromagnet 12 is switched off, the loaded spring 15 and the shutoff valve 2 may very easily open [due to] the pressure prevailing in the chamber 18 (opening against the direction of flow, FIG. 3 and FIG. 4). On the other hand, when a switch is made from the opened position to the closed position, the pressure which once again builds up in the chamber 18 assists in keeping the shutoff valve closed (FIG. 1 and FIG. 2).

However, apart from the illustrated design of the pressure compensation channel through the shutoff valve 2, corresponding channels could also be provided in the compressor housing 16 and in the cylinder head 17 in order to connect the chamber 3 to the chamber 18. In addition, apart from the illustrated design, the valve seat could also be provided as a separate part, preferably pressed into the cylinder head. Some or all of the parts of the shutoff valve 2 (with the exception of the electromagnet 12, of course) could also be made of plastic.

By means of the illustrated system, individual cylinders or an entire cylinder bank may be disconnected in a quickly cyclable manner for capacity regulation; the relatively large flow cross sections ensure low losses at the shutoff valve 2, even with a small, rapid lifting height to be achieved via a small actuating force, and the pressure compensation requires only relatively small actuating forces for switching the shutoff valve 2.

Figure 3:
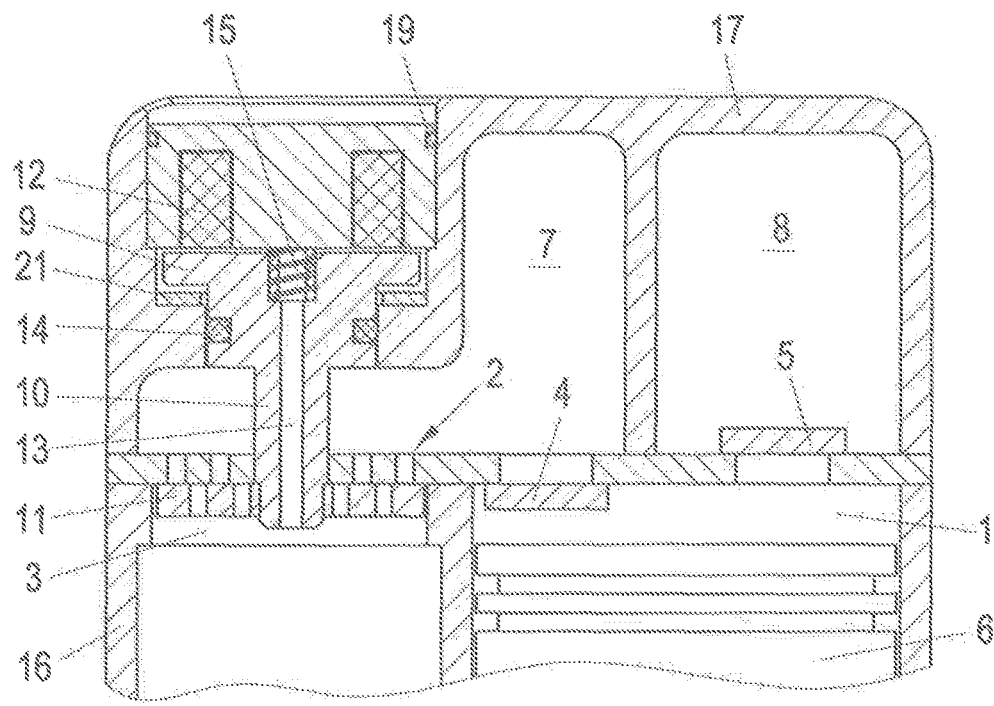
FIGS. 3 and 4 depict another exemplary embodiment in closed and open positions, respectively.
Figure 4:
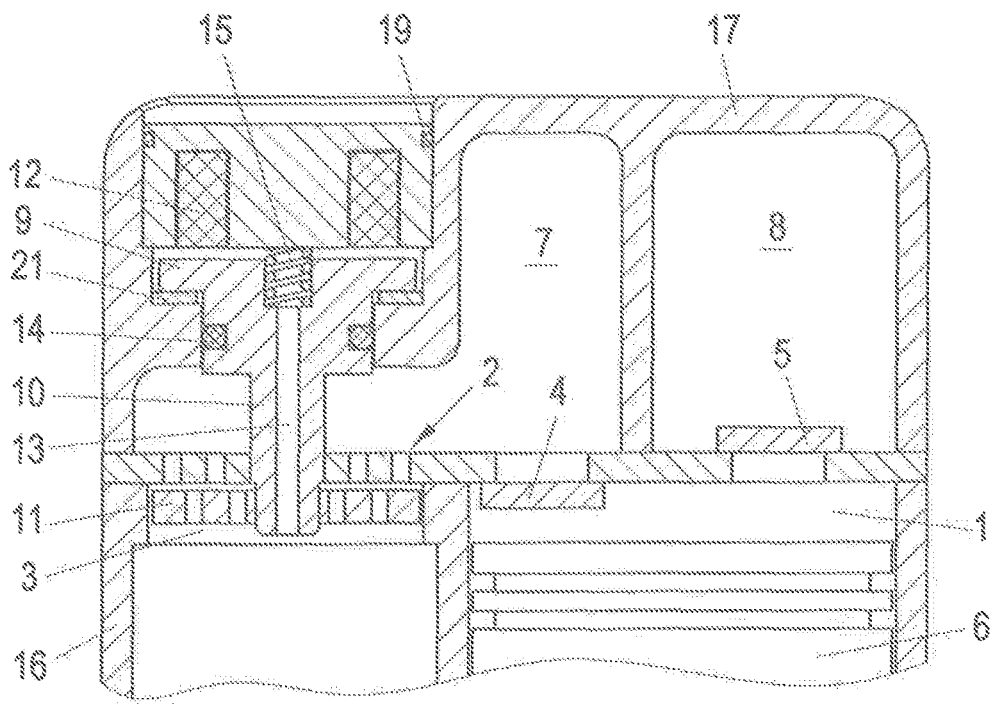

In the exemplary embodiment according to FIGS. 3 and 4, in a departure from the exemplary embodiment according to FIGS. 1 and 2 it is now provided that the valve plate 11 opens against the direction of flow of the suction gas (i.e., downwardly in the illustration). The electromagnet 12 is therefore situated above the anchor plate 9, which in turn is connected to the valve plate 11 via the actuating piston 10—in the present case, sealed off via a seal 19 in a borehole in the cylinder head 17, via which the anchor plate 9 together with the actuating piston 10 is installable. Here as well, the valve plate 11 is tensioned in the opening direction via a loaded spring 15. According to FIGS. 1 and 2, the stop of the anchor plate 9 on the housing side is formed by a disk 20 when the shutoff valve 2 is open, whereas according to FIGS. 3 and 4, for this purpose a ring 21 on the underside of the anchor plate 9 is used.

The other parts in the design according to FIGS. 3 and 4 are similar to those in FIGS. 1 and 2, at least with regard to function, and are provided with the same reference numerals.

In the design according to FIGS. 1 and 2, the pressure compensation surface (lower boundary of the chamber 18) is smaller than the pressure contact surface at the shutoff valve 2. As soon as the electromagnet 12 is switched off, the shutoff valve 2 opens in the direction of flow (FIG. 2). Thus, a net upward force acts due to the larger pressure contact surface at the shutoff valve 2. In contrast, in the design according to FIGS. 3 and 4, the pressure compensation surface is larger than the pressure contact surface at the shutoff valve 2.

As soon as the electromagnet 12 is switched off, the shutoff valve 2 thus opens against the direction of flow (FIG. 4). A net downward force acts due to the larger pressure contact surface at the pressure compensation piston.

The invention claimed is:

1. A reciprocating compressor with a cylinder head that provides capacity regulation,
    said reciprocating compressor including a cylinder containing a movable piston and an intake gas chamber,
    said cylinder head defining a suction chamber for gas to be delivered to the cylinder, at least one intake port communicating between the intake gas chamber and the suction chamber, a discharge port communicating between the suction chamber and the cylinder, and a multi-element ring valve comprising an actuating piston with an anchor plate at one end and a valve plate at an opposite end, the actuating piston being movable between a pressure-compensating chamber in the cylinder head and the at least one intake port to enable the valve plate to open and close the at least one intake port, and an electromagnet which acts directly on the actuating piston to move the valve plate relative to the at least one intake port, and
    a gas flow channel extending through the multi-element ring valve for conveying intake gas from the intake gas chamber to the pressure-compensating chamber.

2. The reciprocating compressor with cylinder head according to claim 1, including a separating plate between said reciprocating compressor and said cylinder head, said at least one intake port and said discharge port extending through said separating plate.

3. The reciprocating compressor with cylinder head according to claim 2, wherein said cylinder head also defines a pressure chamber, and including an outlet port in said separating plate communicating said cylinder with said pressure chamber.

4. The reciprocating compressor with cylinder head according to claim 3, including a first reed valve to control gas flow through said outlet port.

5. The reciprocating compressor with cylinder head according to claim 2, wherein the valve plate is movable against a side of the separating plate opposite the intake gas chamber, and including spring means for biasing the actuating piston and valve plate away from the separating plate.

6. The reciprocating compressor with cylinder head according to claim 5, wherein said spring means comprises a helical spring supported in said actuating piston.

7. The reciprocating compressor with cylinder head according to claim 2, wherein the valve plate is positioned in the intake gas chamber and the actuating piston extends through the separating plate for moving the valve plate against or away from a side of the separating plate facing the intake gas chamber.

8. The reciprocating compressor with cylinder head according to claim 7, including spring means for biasing the actuating piston to move the valve plate away from the separating plate.

9. The reciprocating compressor with cylinder head according to claim 1, including a second reed valve to control gas flow through the discharge port.

10. The reciprocating compressor with cylinder head according to claim 1, wherein said valve plate consists of plastic.

* * * * *